United States Patent [19]

Narbaits-Jaureguy et al.

[11] 3,906,492
[45] Sept. 16, 1975

[54] SYSTEM FOR THE SURVEILLANCE OF OBJECTS MOVING ALONG A ROUTE

[75] Inventors: Jean-Raymond Narbaits-Jaureguy; Henri Billottet, both of Paris, France

[73] Assignee: Thomson-CSF, Paris, France

[22] Filed: July 2, 1973

[21] Appl. No.: 375,445

[30] Foreign Application Priority Data
July 7, 1972 France .............................. 72.24748

[52] U.S. Cl. ............ 343/5 PD; 340/258 B; 343/719
[51] Int. Cl.² ........................................... G01S 9/00
[58] Field of Search ................. 343/5 PD, 719, 841; 340/258 B

[56] References Cited
UNITED STATES PATENTS
| | | | |
|---|---|---|---|
| 2,649,538 | 8/1953 | Marlowe et al. | 343/5 PD UX |
| 3,031,643 | 4/1962 | Sheftelman | 343/5 PD UX |
| 3,739,392 | 6/1973 | Ross et al. | 343/5 PD |

FOREIGN PATENTS OR APPLICATIONS
| | | | |
|---|---|---|---|
| 2,015,295 | 10/1970 | Germany | 343/5 PD |

*Primary Examiner*—Malcolm F. Hubler
*Assistant Examiner*—G. E. Montone
*Attorney, Agent, or Firm*—Karl F. Ross; Herbert Dubno

[57] ABSTRACT

A system for the surveillance of a route along which vehicles are moving, and which operates in real time, comprises radar equipment whose transmitter and receiver are each connected to a leak line acting as an antenna for respectively transmitting outgoing energy from the radar unit and conveying reflected energy back to the radar unit. These lines are mutually decoupled so that only the line connected to the receiver picks up the energy reflected by a moving object or a fixed obstacle situated on the surveyed route.

5 Claims, 4 Drawing Figures

SYSTEM FOR THE SURVEILLANCE OF OBJECTS MOVING ALONG A ROUTE

BACKGROUND OF THE INVENTION

The present invention relates to the surveillance of a route along which vehicles are moving, using a system operating in real time.

Such a surveillance system is generally formed by a radar unit associated with a radiating element positioned along the route under surveillance.

The radiating element may be formed by a so-called leak line, or loss line, that is to say one which radiates energy along its whole length and is also capable of intercepting reflections thereof from extraneous objects. Such a system has been described and claimed in our copending application Ser. No. 375,444 of even date.

The radar unit usually incorporates a pulsed transmitter, a receiver, and a conventional device for measuring the elapsed time between the emission of a pulse and the return of the reflected pulse.

Moreover, the elimination of fixed echoes, in particular those due to linearity defects in the line, which is widely sought because such echoes are liable to interfere with the detection of moving objects, is achieved either by using Doppler radars or by employing other means for this purpose. Nevertheless, the systematic elimination of all fixed echoes has the disadvantage of allowing both stopped vehicles and large stationary objects capable of blocking the highway to evade surveillance.

The object of the present invention is to provide a system for the surveillance of objects moving along a route which enables fixed echoes to be eliminated while still ensuring that large obstacles are detected along this route. We achieve this object by the use of two mutually decoupled radiating elements, the first being connected to the transmitter and the second to the receiver of the radar unit, this arrangement causing accidental reflections due to the first element to be negligible when received by the second element in comparison with reflections from a moving object or an obstacle on the route.

BRIEF DESCRIPTION OF THE DRAWINGS

The invention will be better understood from the following description given with reference to the accompanying drawing in which.

SPECIFIC DESCRIPTION

Figure 1:
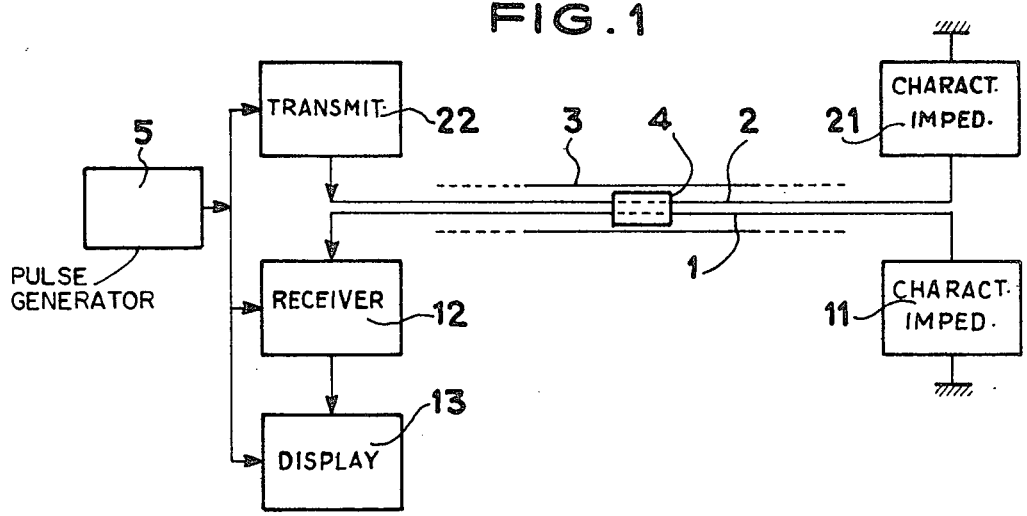
FIG. 1 is a block diagram of a system according to the invention.

In FIG. 1 we have shown a highway 3 on which is moving a line of vehicles one of which is shown at 4; along this highway and preferably in its middle, there are positioned two linear radiating elements 1 and 2, such as leak lines, which are connected at one end to respective loads 11 and 12 matching their characteristic impedances and at the other end to a radar unit.

The radar unit is formed by a transmitter 22, supplying line 2 with pulsed energy a receiver 12 connected to line 1, a utilization device 13 such as a visual display indicator fed by receiver 12, and a pulse generator 5 which synchronizes the operations of members 12, 13 and 22. The output of transmitter 22 and the input of receiver 12 are thus completely independent from each other in this unit.

Such an apparatus operates as follows : If there is no stationary or moving metallic mass near lines 1 and 2, line 1, which is connected to receiver 12, should theoretically not receive any energy if lines 1 and 2 are completely decoupled. However, in practice, this line 1 receives an amount of energy proportional to the coefficient of mutual residual coupling between the two lines, this energy appearing in indicator 13 as a slight increase in noise; on account of the separation of the transmitting function (transmitter 2, line 2) from the receiving function (receiver 12, line 1), accidental reflections due chiefly to linearity defects in line 2 only give rise to disturbances of appreciable magnitude in the latter line, since these reflections are received by line 1 only in a very attenuated form in view of the low value of the coefficient of mutual coupling between the two lines.

If a moving or stationary metal mass such as a vehicle 4 is situated close to the lines, the energy radiated by line 2 is partly reflected by mass 4 and part of it is picked up by line 1. The energy picked up by line 1 is conducted on the one hand to the end of the line terminated in its characteristic impedance at load 21, where the energy is dissipated, and on the other hand to the opposite end of the line connected to receiver 12. Thus, a pulse of emitted energy results, after a time determined by the position of mass 4, in an echo which is displayed or otherwise processed by device 13.

A twin-line structure of this sort thus also makes it possible to considerably simplify known surveillance systems which employ devices for suppressing fixed echoes.

Figure 2:
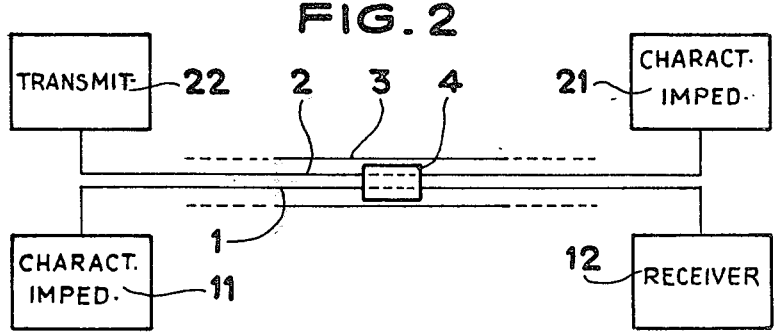
FIG. 2 is a similar block diagram of a modified system according to the invention.

FIG. 2 shows a modified embodiment of our invention in which the arrangement of line 1 is reversed in comparison with the preceding Figure. Thus in FIG. 2 the end of line 1 which is connected to receiver 12 is at the same side as the end of line 2 which is connected to its matching impedance 21. The structure of lines 1 and 2 is such that the propagation of high-frequency energy occurs at substantially different speeds in the two lines.

The advantage of such an arrangement is that the attenuation of the energy passing from transmitter 22 to receiver 11 is constant whatever the position of the moving object 4 which has been detected. The effective length of the transmit path of the transmitted energy is constant in this case, and the amount of attenuation introduced by each line (generally expressed in decibels per meter), is substantially the same.

The difference in the propagation speed of the two lines provides information on the position of the moving object detected. If the receiving line 1 has the lower speed, the delay between transmission of a radar pulse and reception of its reflection decreases as the vehicle 4 moves closer to receiver 12 (i.e. to the right in FIG. 2). Thus, for example, the received energy may travel along line 1 in a dielectric medium in which the speed of propagation is approximately half that in line 2.

Figure 3:
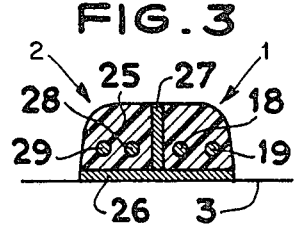
FIGS. 3 and 4 show respective embodiments of radiating elements used in a system according to the invention.
Figure 4:
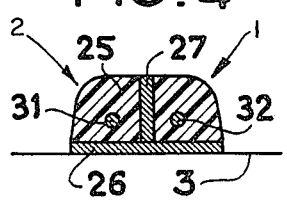

FIGS. 3 and 4 show two possible embodiments of radiating elements for the system according to the invention as shown in FIG. 1.

FIG. 3 is a sectional view of two 2-wire lines, a first conductor pair 28 29, being used as the transmission line 2 and a second conductor pair 18, 19 serving as the reception line 1 these conductors are incorporated in a structure designed to be placed on the surface of the highway 3, as shown in the Figure, or to be embedded therein. The two lines are each enveloped in a dielectric sheath 25 and are separated by a metal strip 27 which acts as a shield decoupling the two lines from each other, the whole assembly being positioned on a metal base 26 adapted to assist upward radiation from the lines.

FIG. 4 is a sectional view of two leak lines for transmission (line 2) and receptor (line 1), each line consisting of a respective conductor 31, 32 enveloped in a dielectric sheath 25, which behave substantially in the same way as coaxial lines with respect to the separating strip or shield 27 and the metal base 26. In both instances, each sheath 25 rests against the base 26 and the shielding strip 27.

Other embodiments of these radiating elements are possible provided that decoupling is ensured by suitable shield means interposed between the transmitting and receiving elements.

We claim:

1. A system for the surveillance of objects moving along a route, comprising:
    a radar installation provided with a source of outgoing high-frequency signals, transmission means connected to said source for emitting said outgoing signals, reception means for signals reflected by extraneous objects on said route, and indicator means for reflected signals connected to said reception means;
    a metallic base extending along said route;
    elongate antenna means including two parallel and coextensive lines subject to leakage losses, said lines being supported alongside each other on said base, one of said lines having one end terminated in a first load matching its characteristic impedance and having its opposite end connected to said transmission means for radiating said outgoing signals, the other of said lines having one end terminated in a second load matching its characteristic impedance and having its opposite end connected to said reception means for picking up said reflected signals; and
    a metallic strip rising from said base between said lines for mutually decoupling same to prevent direct signal transmission therebetween.

2. A system as defined in claim 1 wherein said transmission means is connected to said one of said lines at one end of said antenna means proximal to said second load, said reception means being connected to said other of said lines at the opposite end of said antenna means proximal to said first load.

3. A system as defined in claim 2 wherein the propagation speeds of said lines for high-frequency signals substantially differ from each other.

4. A system as defined in claim 1 wherein each of said lines comprises at least one elongate conductor enveloped in a dielectric sheath resting against said base and said strip.

5. A system for the surveillance of objects moving along a route, comprising:
    a radar installation provided with a source of outgoing high-frequency signals, transmission means connected to said source for emitting said outgoing signals, reception means for signals reflected by extraneous objects on said route, and indicator means for reflected signals connected to said reception means;
    a first and a second line parallel to and coextensive with each other and subject to leakage losses, said lines having substantially different propagation speeds for high-frequency signals, said first line having one end terminated in a first load matching its characteristic impedance and having its other end connected to said transmission means for radiating said outgoing signals, said second line having an end proximal to said other end of said first line terminated in a second load matching its characteristic impedance and having an opposite end proximal to said one end of said first line connected to said reception means for picking up said reflected signals; and
    elongated shield means interposed between said lines for mutually decoupling same to prevent direct signal transmission therebetween.

* * * * *